United States Patent Office 3,681,178
Patented Aug. 1, 1972

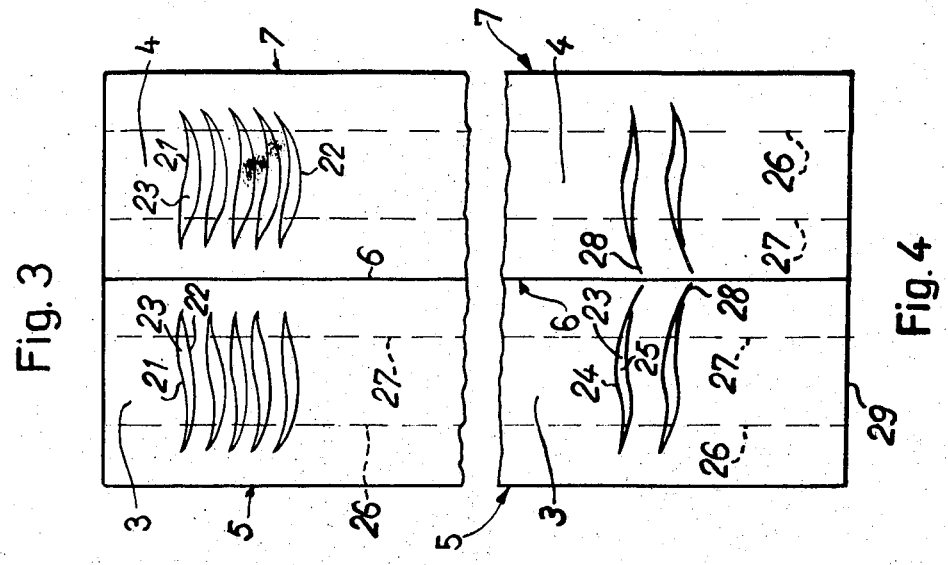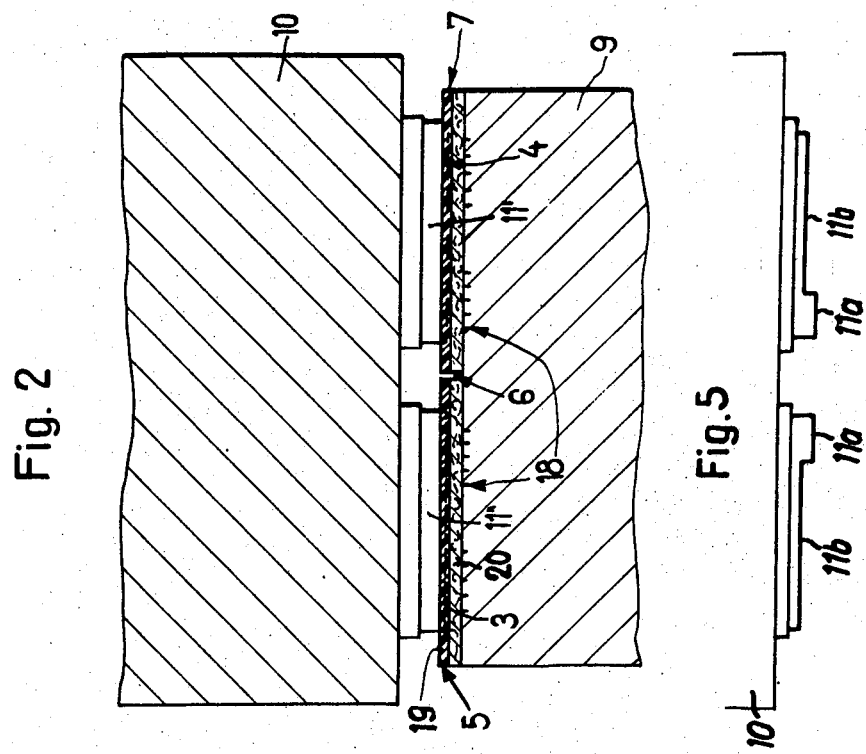

3,681,178
METHOD FOR MANUFACTURING PREFORMED EYE-LINES FOR EYE-LIDS
Marcel Hidore Margulies, Antwerp, Belgium, assignor to Bridal AG, Alpenstrasse, Zug, Switzerland
Filed Feb. 12, 1970, Ser. No. 10,913
Claims priority, application Switzerland, May 8, 1969, 7,087/69
Int. Cl. B32b 31/08, 31/18
U.S. Cl. 156—584                     10 Claims

ABSTRACT OF THE DISCLOSURE

Preformed eye-lines for sticking to the eye-lids and having a contour formed by two curved lines tapering to a point at each end of the eye-line are produced by a method comprising punching out the eye-line by two successive incisions from a self-adhering film adhering with its adhesive side to a backing material. One of said curved lines is cut by the first incision and the other curved line by the second incision. Each incision completely cuts through the film but incompletely cuts through the backing material. The portions of the film situated outside of the cut contour lines of the eye-lines are then stripped from the backing material and the backing material with the eye-lines adhering thereon are cut into suitable lengths and packed for sale.

---

This invention relates to a method for manufacturing preformed eye-lines for eye-lids and to apparatus for manufacturing such eye-lines.

It is known to make up eye-lids by applying a preformed eye-line consisting of a substantially flat elongated film adapted to be stuck to the eye-lid along the lower edge thereof. Preferably, both longitudinal edges of the film are curved and taper to a point at each end of the eye-line. The film consists of paper, a synthetic plastics material or woven fabric and the side of the film which is to be stuck to the eye-lid is coated with a layer of adhesive of a self-adhering type.

The industrial manufacture of self-adhering eye-lines has failed until now owing to absence of an appropriate manufacturing method and of a suitable apparatus, since the punching out of extremely narrow shapes from self-adhering sheets has encountered different difficulties.

The object of the present invention is to obviate these drawbacks.

The invention consists in a method for manufacturing preformed eye-lines having a contour formed by two curved lines tapering to a point at each end of the eye-line. According to the invention, this method comprises punching out the eye-line by two successive incisions from a self-adhering film adhering with its adhesive side to a backing material, one of said curved lines being cut by the first incision and the other curved line being cut by the second incision, each incision completely severing the film, at least one of the incisions also cutting said backing material at least in places, and subsequently stripping the portions of said film outside the eye-line contour from the backing material.

The film with its backing material conveniently is supplied in the form of a band to the place of punching and the incisions are effected transversely to the band. For effecting the cutting operations, the material advantageously passes to a first station, a which the first curved line is cut, and then to a second station at which the second curved line and accordingly the finished eye-line shape is cut, both stations being operative simultaneously.

The invention also concerns apparatus for carrying out the above method of manufacturing preformed eye-lines having a contour formed by two curved lines tapering to a point at each end of the eye-line. According to the invention such apparatus comprises a working table, means for transporting a film of eye-line material adhering to a backing material stepwise over said working table, cutting devices arranged above said table for successively cutting out eye-lines from said film of eye-line material, and means for stripping the portions of the film situated outside the contour of the eye-lines cut into the film from said backing material.

The invention will now be described in detail by way of an example with reference to the accompanying drawings.

FIG. 2 is a transverse section through the working table and the punching head of the apparatus according to FIG. 1;

FIG. 3 is a plan view of a double band of material from which eye-lines are cut out while passing over the working table;

FIG. 4 is a view similar to that of FIG. 3 serving to a modified manner of cutting out the eye-lines from the double band;

FIG. 5 is a view in elevation of the cutting knives used for cutting out the eye-lines according to FIG. 4.

Figure 1:
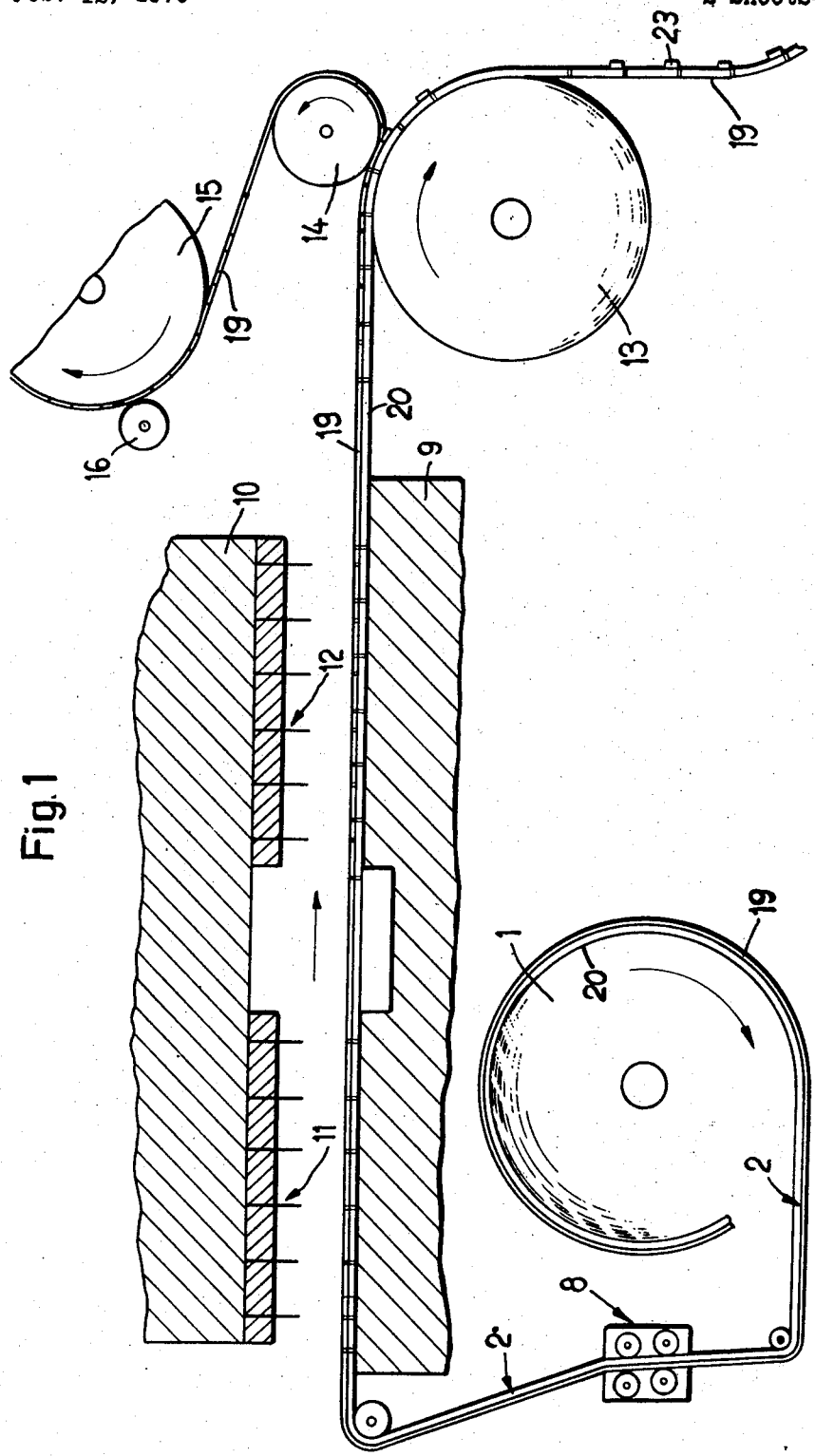
FIG. 1 is a view in longitudinal section diagrammatically representing an apparatus according to the invention for manufacturing preformed eye-lines.

In the mechanical manufacturing of preformed self-adhering eye-lines in the shape of narrow films which are presented to the buyer on a carrier, e.g. a support of card board or paper, it will be started from an essentially two-layer, conveniently band-shaped basic or raw material.

The upper layer of the raw material consists of a suitably dyed self-adhering film the adhesive side of which is applied on a backing material. The contour of each single eye-line is formed by two curved lines tapering to a point at both ends of the eye-line.

In order to obtain the finished product, i.e. preformed eye-lines adhering to a carrier it is proceeded as follows:

The shapes of the eye-lines are produced in two separate steps, in order to guarantee a clean execution, particularly of the pointed ends.

At a first punching station and by a first incision which severs completely from the top the dyed self-adhering film, but the underlying backing material only incompletely at predetermined point-shaped places, the first curved line of the elongate eye-line contour is cut. Afterwards the band-shaped material is moved to a second punching station, where in the same manner the second curved line, and accordingly already the finished eye-line shape is punched. The portions of the film not belonging to the proper product, i.e. to the eye-line, are subsequently stripped from the backing material. The finished eye-lines thus remain adhering to the support, i.e. the backing material.

During punching, conveniently a plurality of cutting lines are simultaneously produced, so that entire series of eye-lines will be formed simultaneously.

The raw material which usually is present in the form of a band, is longitudinally divided prior to punching, into several partial bands and their back sides, i.e. the bottom face of the backing material is scored along, two longitudinally extending lines which will pass in proximity and underneath of the pointed ends of the contour of the eye-lines to be punched out. In this manner an easy separation from the backing material is ensured upon the later use of the eye-lines. The punched shapes of the eye-lines cannot fall off the backing material, since the cutting lines do not completely penetrate through the backing material at all places. However, they can easily be broken out from the remaining portion of the support together with the backing material situated directly underneath the eye-line shapes.

FIG. 1 of the drawing represents diagrammatically a longitudinal section through an apparatus for carrying out the above described method.

A two-layer raw material band 2 is drawn off a roller 1 and is cut into partial bands 3, 4 (see FIG. 3 longitudinal cutting lines 5, 6 and 7) by a continuously operating longitudinal cutting device 8. At the same time, the cutting device 8 effects a longitudinal scoring of the underside of the two partial bands 3, 4 along two lines 26 and 27 (FIG. 3). The bands then arrive on a working table 9, above which there is provided a cutter head 10 having two groups of knives 11 and 12. The two-layer band 2 is composed of a film 19 consisting of paper, of a synthetic plastics material or of a woven fabric, and of a backing material 20 of card-board or paper. The film 19 adheres to the backing material 20 by means of an adhesive coating of the self-adhering type.

The cutter head 10 is intermittently moved up and down according to a predetermined working cycle, the cutting out or punching out of the eye-lines being effected during the downward movements, namely first curved lines 21 (FIG. 3) are punched with the group of knives 11 (FIG. 1) and, after a predetermined forward movement of the band 2, second curved lines 22 closing the contour of the eye-lines, are cut with the group of knives 12.

Each group of knives 11 and 12 obviously could be provided on a separate cutter head.

For transporting the band of material 2 over the working table 9 there is provided a pair of rollers 13, 14; the roller 13 is driven intermittently in the direction of the arrow, preferably by a stepping motor. The roller 14 at the same time serves as guide roller in order to strip the portion of the self-adhering film 19, not belonging to the eye-lines, but situated outside of the cutting lines 21 and 22, from the backing material 20. Further guide and drive rollers 15, 16 serve to carry away the film 19 from which the eye-lines 23 have been cut out.

FIG. 2 is a cross section through the table 9 and the cutter head 10. In the represented cutter head 10 each group of knives, e.g. the group 11, consists of two adjacent identical groups 11′, 11″. In order that the carrier material 20 underneath the film 19 is not completely cut across at all points, the table is provided with series of longitudinal grooves 18 of a width e.g. less than 1 mm. When the knives 11′, 11″ move downwardly to cut the curved contour lines 21 and 22 of the eye-lines and abut against the surface of the table 9, the lowermost portions of the backing material 20 situated just on top of the grooves 18 will be pushed slightly into the open grooves and will not be cut by the knives, but at each point where the knives cross a groove a thin web of backing material will remain.

After having passed the working table 9, the two-layer band 2 is drawn through the pair of rollers 13, 14 where the portion of the film 19 from which the eye-lines 23 have been cut out is separated from the backing layer 20. The cut out eye-lines 23 remain adhering to the backing layer which passes around the roller 13 and is led to a packing station (not shown) where the band is cut in suitable lengths each carrying a certain number of eye-lines 23. These lengths are then packed in suitable manner for sale. The stripped-off film 19 is carried away as scrap by the rollers 15 and 16.

In a further example of execution of the method (FIG. 4) it will be started again by the successive punching of the two curved contour lines 24 and 25. Also the backing material is provided with two longitudinal scoring lines 26 and 27. While, however, the lower boundary line only traverses the film 19 but not the backing material 20, the punching of the upper boundary line 24 is so effected that the punching cut, between the scored line 26 and 27 only traverses the film but not the backing material.

However, between the scored line 27 and the outer edge 6 of each partial band 3 and 4 the cutting line 24 of the upper contour of the eye-line 23 traverses the film 19 and the backing material 20 and is extended outwardly until short of the lateral edges 6 of the two bands. Between the edges 6 and the end of the upper cutting line a small web 28 of material remains which can be easily torn. When the punching of the eye-line is effected in this manner, the portions of the film 19 not pertaining to cut eye-lines 23 will be severed from the backing material by the rollers 13 and 14 and the backing material then is cut into small lengths, carrying one or several eye-lines. The knives for cutting the upper contour of the eye-lines according to this modified method are represented in FIG. 5. These knives comprise a wider blade portion 11a for cutting the end portion of the upper contour between the scored lines 27 of the bands 3 and 4 until the web 28, and a narrower blade portion 11b for cutting the remaining portion of the upper contour between the scored lines 27 and 26 and beyond the scored line 26.

The user who will apply an eye-line to his eye-lid takes such a length of backing material with one or several eye-lines thereon in his fingers by holding it at the portion limited laterally by the outer edge 6 and the score line 27, upwardly by the cutting line 24 and downwardly by the edge 29 of the backing material or by the cutting line 24 of a previously removed eye-line. He then strips the portion of the eye-line adhering to this portion of the backing material and sticks it on his eye-lid at the inner end thereof, and then he removes the remaining portion of the eye-line from the backing material, discards this material and sticks this remaining portion of the eye-line to the lid.

With respect to the first described example, this procedure offers the advantage that the complications and difficulties are avoided which result upon stripping the two portions of the backing material situated underneath the sheet contour.

I claim:

1. A method of manufacturing preformed eye-lines having a contour formed by two curved lines tapering to a point at each end of the eye-line, which method comprises punching out the eye-line by two successive incisions from a self-adhering film adhering with its adhesive side to a backing material, one of said curved lines being cut by the first incision and the other curved line being cut by the second incision, each incision completely severing the film, at least one of the incisions also cutting completely through said backing material along a portion of its corresponding curved line, and subsequently stripping the portions of said film outside the eye-line contour from the backing material.

2. A method according to claim 1, in which said self-adhering film and backing material is supplied in band-shape to the place of punching, and the eye-lines are cut out in a position extending transversely to the band.

3. A method according to claim 2, in which the band is longitudinally cut into a plurality of partial bands of predetermined width prior to cutting out the eye-lines, the backside of the backing material of each partial band being scored in longitudinal direction of the band along at least one line.

4. A method according to claim 3, in which the backing material of each partial band is longitudinally scored along two lines, each line extending underneath and in proximity of one of the pointed ends of the eye-line contour to be subsequently cut transversely to the band.

5. A method according to claim 2, in which, after punching out the eye-line coutours from said band, the band is moved to a place of separation from where the backing material carrying the eye-lines and the film portions situated outside of the contour of the eye-lines are carried away in different directions.

6. A method according to claim 2, in which said band is moved to a first operating station to cut said first incision and then to a second operating station to cut said second incision, both operating stations being operated simultaneously.

7. A method according to claim 6, in which at each station a plurality of first and second incisions are cut simultaneously.

8. A method according to claim 1, in which each of said incisions completely cuts through the film and the backing material, while at certain places the backing material is not completely cut through.

9. A method according to claim 1, in which only one of said incisions cuts through the backing material.

10. A method according to claim 3, in which one of said incisions cuts through the backing material from one of said scored lines to the adjacent band edge.

References Cited

UNITED STATES PATENTS

| | | | |
|---|---|---|---|
| 3,266,500 | 8/1966 | Weld | 132—53 |
| 2,304,787 | 12/1942 | Avery | 156—248 |
| 3,524,782 | 8/1970 | Buske | 156—248 |
| 2,835,259 | 5/1958 | Goodman | 132—53 |

BENJAMIN A. BORCHELT, Primary Examiner

J. M. HANLEY, Assistant Examiner

U.S. Cl. X.R.

156—234, 268, 344, 540